United States Patent [19]

Naegelli et al.

[11] Patent Number: 5,299,386

[45] Date of Patent: Apr. 5, 1994

[54] SAFETY GATE ASSEMBLY

[75] Inventors: Robert W. Naegelli, Edmond, Okla.; Norbert Hahn, Franklin, Wis.

[73] Assignee: Rite-Hite Corporation, Milwaukee, Wis.

[21] Appl. No.: 799,032

[22] Filed: Nov. 27, 1991

[51] Int. Cl.⁵ ............................................. E05F 15/02
[52] U.S. Cl. .................................... 49/28; 49/340; 49/27
[58] Field of Search ............. 49/324, 340, 28, 27, 49/109, 386; 14/71.1, 71.3, 71.5, 71.7

[56] References Cited

U.S. PATENT DOCUMENTS

| | | |
|---|---|---|
| 209,257 | 10/1898 | Hadley et al. |
| 218,546 | 8/1879 | McAneny et al. |
| 774,881 | 11/1904 | Ingersoll |
| 859,489 | 7/1907 | Donovan |
| 1,120,055 | 12/1914 | Hart et al. |
| 1,368,844 | 2/1921 | Sawin |
| 2,563,770 | 8/1951 | Yantes et al. ............ 49/340 X |
| 2,563,894 | 8/1951 | White |
| 2,807,107 | 9/1957 | Goulet |
| 3,352,059 | 11/1967 | Metz ............................. 49/27 |
| 3,855,733 | 12/1974 | Miller ........................... 49/27 X |
| 4,051,336 | 9/1977 | Miller ........................... 49/27 X |
| 4,519,164 | 5/1985 | Porter .......................... 49/340 X |
| 4,658,543 | 4/1987 | Carr ............................. 49/25 X |
| 4,750,295 | 6/1988 | Court et al. .................. 49/340 |
| 4,782,628 | 11/1988 | Gaddis .......................... 49/340 |
| 4,796,385 | 1/1989 | Tyler ............................ 49/340 X |
| 4,844,567 | 7/1989 | Chalabiau ..................... 49/386 X |
| 4,934,203 | 6/1990 | Bailey et al. .................. 49/340 X |
| 4,986,031 | 1/1991 | Agnew et al. ................. 49/340 X |
| 5,027,552 | 7/1991 | Miller et al. .................. 49/28 X |

Primary Examiner—Peter M. Cuomo
Assistant Examiner—Jerry Redman
Attorney, Agent, or Firm—Leydig, Voit & Mayer, Ltd.

[57] ABSTRACT

A safety gate assembly is provided for use at a loading dock to prevent accidental or inadvertent movement of a loading dock vehicle through an access passageway provided on the loading dock. The assembly includes a pair of laterally spaced, upright, stationary support members positioned on opposite sides of the passageway and a housing removably mounted on one support member. An elongate gate segment is hingedly connected to the housing for movement between operative passageway-blocking and inoperative passageway-unblocking modes. When in the operative mode, the gate segment spans the distance between the support members. Movement of the gate segment is effected by a motor driven element connected to the segment and disposed within the housing. A stop is mounted for engaging the gate segment only when the latter is in the operative mode. A safety device is operatively connected to the element drive motor and is mounted on the segment and effects interruption of the movement of the elongate element if an external object obstructs the movement of the segment between the modes.

19 Claims, 2 Drawing Sheets

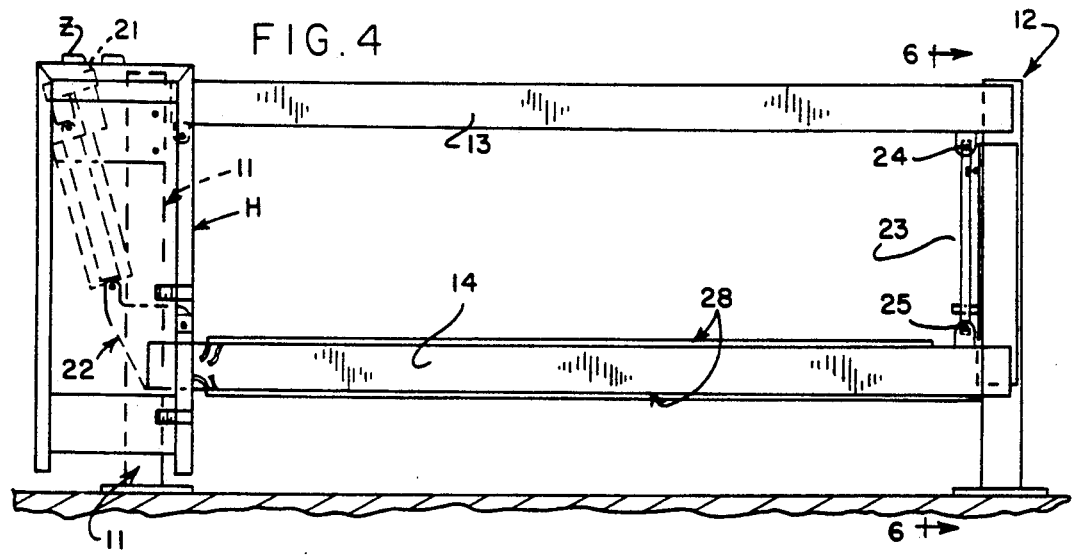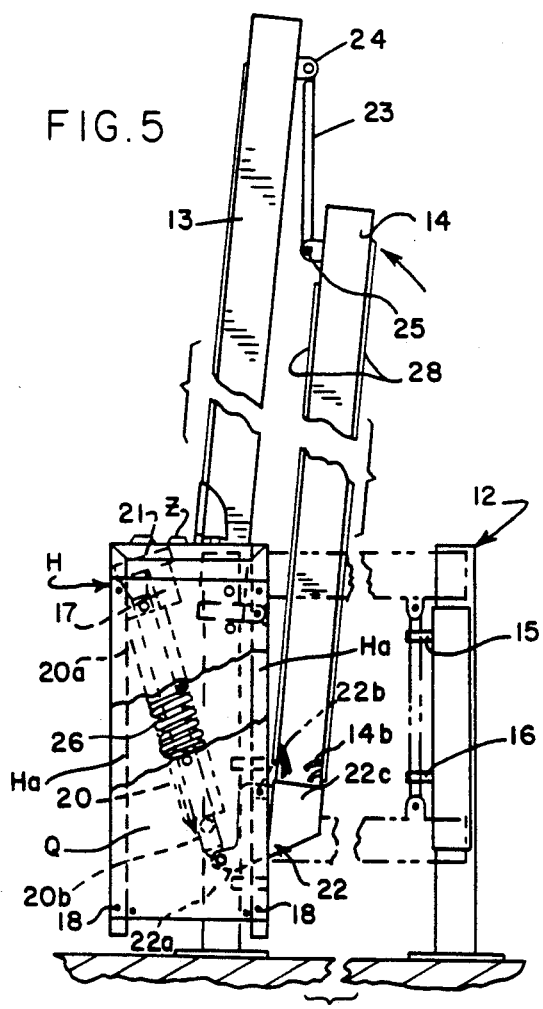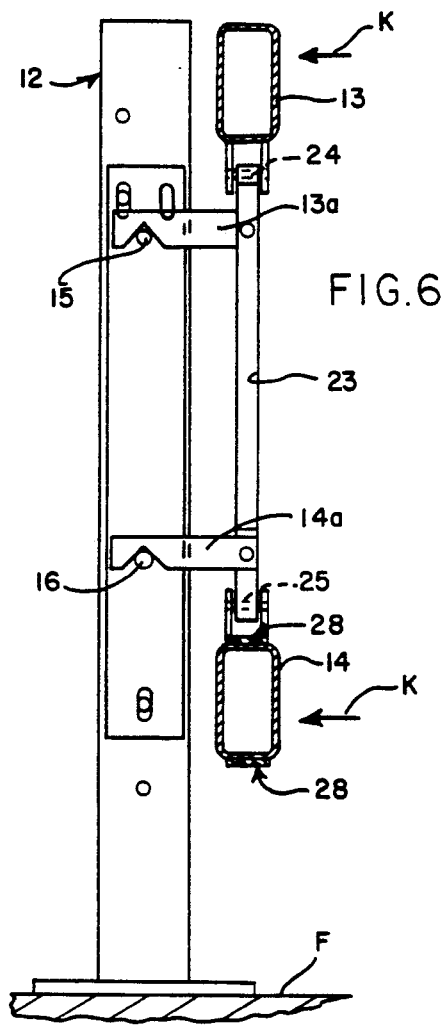

1

SAFETY GATE ASSEMBLY

BACKGROUND OF THE INVENTION

In loading dock operations, particularly where motorized fork-lift vehicles are utilized, safety is of paramount concern for the protection of personnel, equipment, and goods being handled. In many instances, human error is the principal cause resulting in severe personnel injury and/or serious damage to goods and equipment. In many loading dock facilities, loading stations are provided which utilize vertically adjustable platforms or dock lifts which may be lowered within a pit or recess formed in the exposed horizontal surface of the loading dock. In such installations when the dock lift is in its fully lowered position, the truck to be loaded or unloaded may be spotted on the dock lift and then the latter raised to the desired height or a fork-lift vehicle may be spotted on the dock lift and raised or lowered, as required, to effect loading or unloading of a parked truck.

In addition to or in lieu of the vertically adjustable platform or dock lift, a dock-leveler may be provided which is hingedly adjustable to compensate for any height differential which might exist between the exposed horizontal surface of the loading dock and the bed of the truck parked at the dock station during loading or unloading thereof.

When the dock lift and/or the dock leveler are in their normal rest position, that is to say when the exposed horizontal surface thereof is in coplanar relation with the adjacent horizontal dock surface, there is an ever-present danger of the fork-lift vehicles and the like when carelessly maneuvered across the coplanar surface, falling off the edge of dock with extremely serious life-threatening consequences. In situations where the platform or dock lift is lowered relative to the horizontal dock surface careless maneuvering of the fork-lift vehicles can cause them to fall onto the recessed dock lift or drive off an exposed edge of loading dock.

In many loading dock facilities, access passageways to the interior of a warehouse, plant or like building are aligned with the various loading/unloading stations provided along the dock facility. Each such passageway is normally provided with a security door which may be in a closed or open position when the station is not being used. When in the closed position, such a security door is susceptible to being hit or struck on the inside by a load-handling vehicle being maneuvered within the warehouse, plant or like building. When, however, the security door is raised for ventilating purposes, there is a danger that a fork-lift vehicle or the like might accidentally pass through the open passageway and fall off the dock platform.

Heretofore, in attempting to remedy these hazardous situations, complex and expensive structures have been installed at the various stations which require an inordinate amount of space and are highly susceptible to malfunction. Furthermore, such structures in some instances require special power sources which added materially to the initial product costs. Lastly, such prior structures are incapable of withstanding heavy impact forces from loaded fork-lift vehicles and the like which may occur during normal fork-lift traffic.

SUMMARY OF THE INVENTION

Thus, a safety gate assembly is provided which may be readily installed in existing or newly constructed loading docks. The improved safety gate assembly is capable of operating properly under extreme climatic conditions. The improved assembly incorporates safety features which protect personnel while the assembly is being actuated between operative and inoperative modes.

Further and additional advantages of the improved safety gate assembly will become apparent from the description, accompanying drawings and appended claims.

In accordance with one embodiment of the invention, a safety gate assembly is provided which is adapted to be incorporated in a loading dock in which the latter is provided with a loading/unloading station having an access passageway. The assembly includes a pair of laterally spaced, stationary upright support members mounted on opposite sides of the passageway. Mounted on a selected one of the support members for movement in a substantially vertical plane between operative and inoperative modes is a gate means. The gate means includes elongate upper and lower segments each of which has one end thereof hingedly mounted within a shield means, the latter being secured to the selected support member. The corresponding one ends are disposed at vertically spaced locations. When the gate means is in the operative mode, the elongate segments are horizontally disposed and span the distance between the support members blocking the passageway. On the other hand, when the gate means is in the inoperative mode, the elongate segments assume an upright substantially side by side relation and are disposed to one side of the passageway unblocking the latter.

Disposed within the shield means is a drive means which includes a linear actuatable element having a distal end pivotally connected to one of the elongate segments for effecting controlled unitary movement of the segments between the operative and inoperative modes. A further means is disposed within the shield means which cooperates with the elongate segments and assists the drive means in actuating the elongate segments from the operative to the inoperative modes.

Stop means is provided which engage the gate means segments only when the latter assumes the operative mode. The stop means limits the extent to which the elongate segments can pivot in one direction. Operatively connected to the drive means is a safety means, which is responsive to an object positioned so as to obstruct movement of the segments between the modes. The safety means senses the obstructing object and may either automatically interrupt movement of the elongate segments or automatically reverse the direction of movement thereof.

DESCRIPTION OF THE DRAWINGS

For a more complete understanding of the invention reference is made to the drawings wherein:

FIG. 4 is a fragmentary rear elevational view per se of the improved gate assembly of FIG. 1, shown in an operative mode.

FIG. 5 is similar to FIG. 4 but showing the gate assembly in an inoperative mode and with a cover plate partially removed from a shield means so as to reveal a drive assist spring mounted within the shield means.

FIG. 6 is an enlarged sectional view taken along line 6—6 of FIG. 4.

DESCRIPTION

Figure 1:
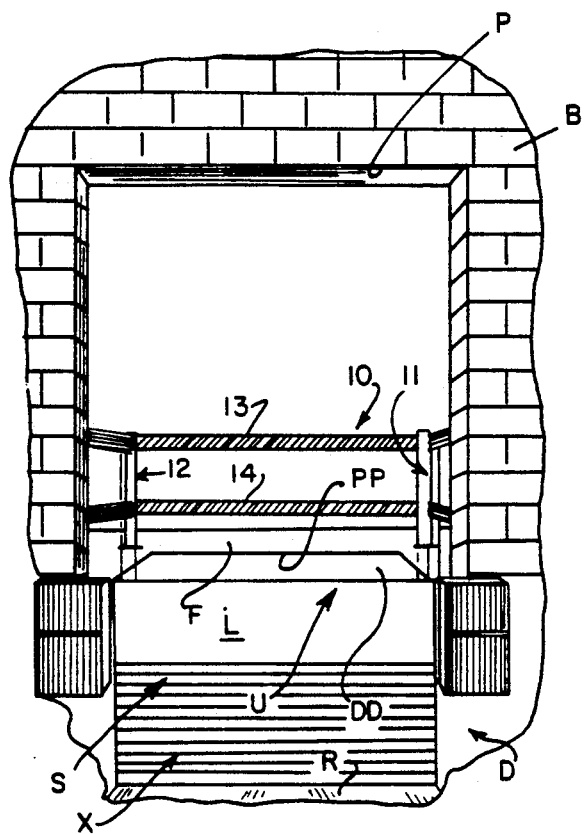
FIG. 1 is a fragmentary outside, front, perspective view of a dock loading/unloading station incorporating one embodiment of the improved safety gate assembly, the latter being shown in an operative mode.

Referring now to the drawings and more particularly to FIG. 1, one embodiment of the improved safety gate assembly 10 is shown installed at a loading/unloading station S of a loading dock D. The station is provided with an access passageway P formed in an exterior wall of a building B serviced by the loading dock D. An interior floor F of the building is elevated relative to a roadway R on which a truck or trailer is parked while being loaded or unloaded by a fork-lift vehicle or the like. The floor F is provided with a pit or recess PP which is aligned with the access passageway P. The pit is of conventional design with vertical back and side walls. The front of the pit opens at the exterior wall of the building B. The depth of the pit as shown in FIG. 1 is normally substantially equal to the vertical distance between the roadway R and the building interior floor F.

Mounted within the pit in the illustrated embodiment is a vertically adjustable platform unit U. The unit includes a horizontally disposed dock lift DD which is movable vertically between at least a normal raised position wherein the exposed surface of the dock lift is substantially flush with the interior floor F of the building, see FIG. 1, and a fully down position, not shown, wherein the dock lift exposed surface is substantially flush with or proximate to the roadway surface. The platform unit U may be of the type disclosed in U.S. Pat. No. 4,995,130, dated Feb. 26, 1991. In lieu of the illustrated platform unit, the latter may include a dock-leveler of the type disclosed in U.S. Pat. No. 4,110,860, dated Sep. 5, 1978. Neither type of platform unit forms a part of the claimed invention.

Hingedly connected to the front edge of the dock lift is a conventional lip plate L which is adapted, when in an operative mode, to assume an outwardly cantilevered position spanning a gap which occurs between the rear of the parked truck or trailer and the front edge of the dock lift. Thus, when in the operative mode, the lip plate allows forklift vehicles and the like to readily pass between the truck or trailer bed and the dock lift in a safe and unobstructed manner.

Attached to the underside of the dock lift and adjacent the front edge thereof may be an accordion-type wall panel X, the lower edge of which is secured to the front edge of the bottom surface of the pit. The width of the panel corresponds substantially to the distance between the pit side walls. The panel X functions as a protective barrier preventing debris and foreign matter from accumulating in the pit which may interfere with the operation of the power mechanism, not shown, located within the pit for raising and lowering the dock lift. The panel X may also deter acts of vandalism directed at the platform unit U when the station S is not being utilized.

The passageway P is normally provided with a conventional roll-type security door, not shown, which closes off the passageway when the station is not being utilized.

The safety gate assembly 10, as illustrated, includes a pair of laterally spaced, upright post-like support members 11 and 12 which may be of like construction. One support member is disposed adjacent each side of the passageway and preferably within the building interior. The support members are laterally spaced apart a greater distance than the width of the passageway thus, not obstructing the use of the passageway during the loading/unloading operation.

Figure 3:
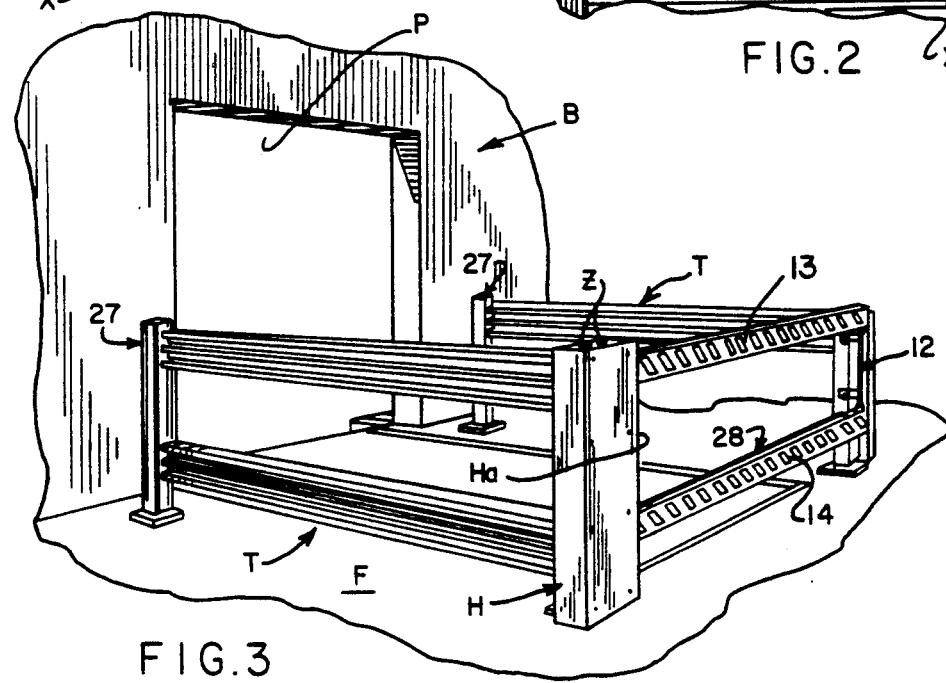
FIG. 3 is a fragmentary, perspective, inside view of the gate assembly of FIG. 1.

As seen in FIG. 3 where the interior floor F is provided with the pit P, the support members 11 and 12 are preferably spaced inwardly from the building outside wall and are substantially flush with a vertical plane defined by the back wall of the pit. Affixed to the back side of a selected one of the support members 11 or 12 is a shield member which may be in the form of a housing H in which is mounted a pair of elongate segments or bars 13 and 14 power driven for hinged movement between operative and inoperative modes. When the segments 13 and 14 are in the operative mode, as seen in FIG. 3, they extend horizontally from a side wall Ha of housing H and span the distance between the support members. While in such a mode the segments may be disposed in vertically spaced, substantially parallel relation thereby effecting blockage of the access passageway P. While in the operative mode, the distal or free end of one or both segments 13 and 14 may be provided with angularly disposed laterally extending latches 13a, 14a which are preferably notched on the underside so as to accommodate corresponding stop pins 15, 16 affixed to support member 12, see FIG. 6. The latches and pins cooperate so as to limit the downward pivotal movement of the segments and restrain to a limited extent lateral horizontal movement thereof when in the operative mode.

In lieu of the latch and pin combination, as shown, one or both of the segments may be provided with a depending curved stirrup which is located near the housing side wall Ha. When the segments are in an operative mode, an end of each stirrup abuts the housing side wall stopping further downward pivotal movement of the segments.

When the segments 13 and 14 are in the operative mode, the distal ends thereof are disposed behind the back side of support member 12. Thus, if the segments 13 and 14 are impacted by a substantially horizontal force, shown by arrows K in FIG. 6, the distal ends will abut the back side of support member 12 and be restrained thereby.

Figure 2:
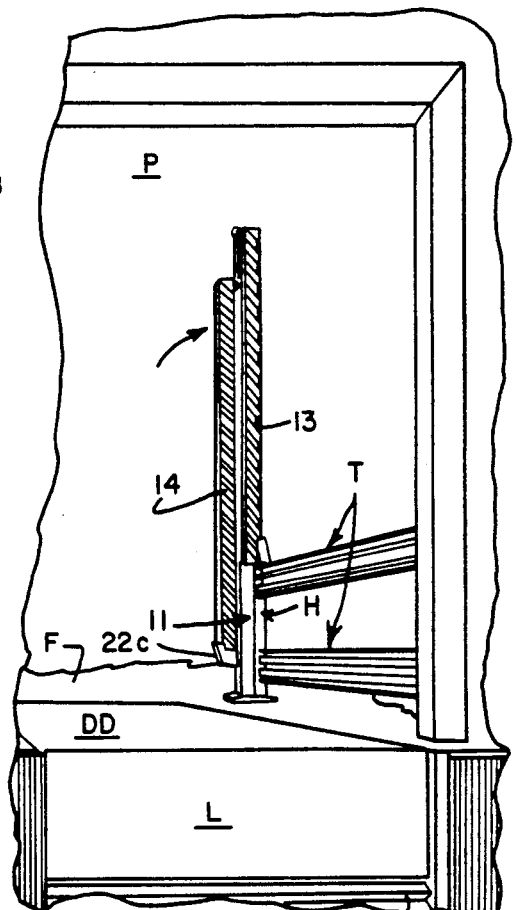
FIG. 2 is a fragmentary enlarged view of the assembly of FIG. 1 but showing the same in an inoperative mode.

When in the inoperative mode, the segments assume an upwardly extending side by side non-blocking relation relative to the access passageway, see FIG. 2. The segments are moved between the operative and inoperative modes by a drive unit 17 which is mounted within and concealed by housing H, see FIG. 4. Access to the interior of housing H for servicing and adjustment of the drive unit is accomplished by removing a panel Q held in place by a plurality of screw fasteners 18, see FIG. 5. The same arrangement may be provided for the housing wall opposite the panel Q.

The drive unit 17 preferably includes a telescoping shaft 20 which may extend angularly downwardly from a gear box casing 21 secured in a fixed position within the housing interior. The telescoping shaft, as illustrated, includes an upper tubular section 20a having an upper portion journalled in casing 21. The upper portion may be provided with external splines which mesh with a motor driven gear, not shown, disposed within the gear box casing.

The lower section 20b of telescoping shaft 20 projects downwardly and moves linearly in an endwise direction from the upper tubular section 20a and has the lower distal end of shaft section 20b pivotally connected to a finger-like portion 22a of a lever-like attachment 22. The attachment 22 is pivotally connected at 22b to a lower interior portion of housing H. An end 14b of the lower segment or bar 14 is removably connected to a pocket portion 22c formed in the attachment 22 and spaced from both portion 22a and connection 22b, see FIG. 5. The segment extends at substantially a right angle from the finger-like portion 22a. Thus, by reason of this arrangement the attachment 22 needs to be rotated in a counter-clockwise direction about pivot connection 22b through an arc of approximately 90° when the segments 13, 14 are moved from an operative mode, FIG. 4, to an inoperative mode, FIG. 2. The reverse action occurs when the segments move from the inoperative mode to the operative mode.

It will be noted in FIGS. 2 and 5, that the pocket portion 22c projects outwardly from the housing side wall Ha when the segments are in the inoperative mode, and thus, segment 14 may be readily replaced when necessary without requiring cover panel Q being removed from the housing.

To effect unitary movement of the segments 13, 14 between the operative and inoperative modes, the distal or free ends of the segments may be interconnected by an elongate rod 23. The ends of the rod 23 are pivotally connected at 24, 25 to corresponding segments 13 and 14, respectively, see FIG. 6.

In order to reduce the size and power of the electric drive motor 17 required to effect rotation of the segments, an assist coil spring 26 may be utilized which encompasses the telescoping shaft 20. The spring is sized so that it will readily fit within the interior of housing H and the tension exerted thereby will substantially assist the linear outward movement of the lower shaft section 20b with respect to the upper tubular section 20a when driven by the drive motor 17 and thus, cause the segments 13, 14 to simultaneously pivot from the horizontal position, FIG. 4 to the upright position, FIG. 5. When segments 13 and 14 are in the operative mode, spring 26 is compressed to the greatest extent. On the other hand, when the segments are in the inoperative mode, the spring assumes a substantially relaxed condition. The upper end of spring 26 may be attached to a stationary member such as gear-box casing 21 and the lower end of the spring is connected to the lower shaft section 20b. The advantages of utilizing a telescoping shaft 20, small drive motor 17 and assist spring 26 are a) they may be readily mounted within the housing H; b) they are of simple, inexpensive construction; c) they are readily accessible for servicing and repair; and d) only a conventional electrical power source is required for energizing the motor.

Where the support members 11 and 12 and housing H are recessed inwardly from the exterior wall of the building B, as clearly seen in FIG. 3, a pair of upright stanchions 27 are fixedly mounted on the interior floor F on opposite sides of passageway P and in close proximity to the building outside wall in which the passageway is formed. Corresponding support members and stanchions are in alignment with one another and are interconnected by one or more rails T. The rails not only provide reinforcement for the support members and stanchions but also form an entry to the passageway and prevent lateral or cross-traffic by load handling equipment within the entry. The rails and stanchions are utilized only when the pit is located inwardly of the passageway P. Where, however, only a dock leveler is utilized, the support members 11 and 12 may be positioned in close proximity to the passageway and the outside wall of the building B, thus, eliminating the need for the rails T and stanchions 27.

The housing H is of such construction that it may be readily mounted on the back side of either support member 11 or 12 thereby locating the elongate segments on either side of the passageway. When the housing is mounted on support member 12, the housing is rotated 180° about a vertical axis so that the side wall Ha of the housing from which the segments 13 and 14 extend faces the support member 11. The housing is secured to the support member by suitable bolts. As aforementioned, support members 11 and 12 are preferably of like construction. Thus, by reason of the housing being selectively mounted on either support member a) the initial cost of the assembly is reduced because fewer different component parts are required; b) parts inventory requirements are reduced; and c) greater flexibility is provided for the end user such as re-orienting the gate assembly to accommodate particular traffic patterns.

To prevent pinching or injury to the hand and/or arm of dock personnel when the segments 13 and 14 are raised or lowered into inoperative or operative modes a safety device 28 (e.g. a strip-switch) may be mounted on the top and bottom surfaces of segment 14. Each such device is of conventional design and is electrically connected by leads in series with the power source and the drive motor for the telescoping shaft 20. In one embodiment each switch is normally closed and is readily opened automatically stopping or reversing the direction of movement of the segments when an external object assumes an obstructive position with respect to the path of movement. Once the obstructive object is removed the safety device will once again close allowing the segments to be rotated in the desired direction. Movement of the segments in the desired direction is initiated by manual control buttons Z mounted on the housing H or at a remote location.

In lieu of the strip-switches, shown in FIG. 4, a conventional photo-electric cell assembly or object detector (e.g. infra-red sensor) may be utilized. When the cell assembly is used the components thereof may be mounted on opposite ends of at least one segment. On the other hand, when using the infra-red sensor the relative location thereof may vary.

Thus, an improved safety gate assembly has been provided which is effective in reducing serious accidents when fork-lift vehicles and the like are handled in a careless manner. The improved assembly may be readily installed in new and existing dock facilities which vary in size over a wide range. The improved assembly utilizes a minimum number of component parts and may be operated in combination with a wide variety of dock-levelers and lifts. Furthermore, the improved assembly may incorporate safety devices for the protection of personnel when in the vicinity of the moving segments. The improved assembly may be readily installed so that the elongate segments pivot from either side of the passageway without the need for any assembly component part being changed. Thus, the user has greater flexibility in locating or relocating the assembly to accommodate a particular traffic or relocating pattern.

We claim:

1. A safety gate assembly mountable for use as an impact barrier at a loading dock station provided with an access passageway, said assembly comprising a pair of stationary, laterally spaced, upright support members positionable on opposite sides of the passageway; shield means selectively mounted on one of the support members; hingedly mounted gate means proximate said one support member and shield means and including at least one hingedly mounted elongate segment selectively movable between an operative passage-blocking mode and an inoperative non-blocking mode, the movement of said one segment being in a path defining a substantially vertical plane, when in the operative mode, said elongate segment being substantially horizontally disposed and spanning the distance between said support members; drive means disposed proximate said one support member and shield means and having an actuatable element drivable between a retracted position and an extended position and operatively connected to said one segment for effecting controlled movement of said one segment between said modes; drive-assist means operatively connected to said actuatable element and continually biasing said actuatable element toward a position such that the drive-assist means enhances the force applied by the actuable element to the one segment to effect movement of the one segment from the operative mode to the inoperative mode; and stop means mounted for engaging said one segment only when said one segment assumes the operative mode.

2. The safety gate assembly of claim 1 wherein the shield means includes a housing in which the drive means, drive-assist means and predetermined portions of the one elongate segment are mounted.

3. The safety gate assembly of claim 2 wherein at least the drive means, drive-assist means and predetermined portions of the gate means segment are substantially concealed within said housing, the latter being provided with a removable panel to provide access to the housing interior.

4. The safety gate assembly of claim 1 including safety means operatively connected to the drive means for automatically interrupting actuation of the drive means element when an external object assumes an obstructive position with respect to the path of movement of the elongate segment.

5. The safety gate assembly of claim 4 wherein the safety means includes a normally closed switch in series connection with an electric motor forming a component of the drive means.

6. The safety gate assembly of claim 5 wherein the safety means switch is in the form of a pressure-sensitive strip mounted on at least an upper surface portion of the elongate segment.

7. The safety gate assembly of claim 4 wherein the safety means includes a switch in series connection with an electric motor forming a component of the drive means.

8. The safety gate assembly of claim 7, wherein the safety means switch is in the form of a photo-electric cell assembly with components mounted at either end of the elongate segment, the assembly being mounted on at least an upper surface portion of said elongate segment.

9. The safety gate assembly of claim 1 wherein the shield means and the stop means are mountable for hinged rotational movement on either of said support members.

10. The safety gate assembly of claim 1 wherein the support members are substantially of like configuration.

11. The safety gate assembly of claim 1 wherein the actuatable element includes elongate upper and lower telescoping sections, said lower section being linearly actuatable and having an end thereof pivotally connected to the gate means segment, and the upper section being in driving engagement with said drive means effecting linear actuation of said lower section.

12. The safety gate assembly according to claim 11, wherein the drive-assist means is a compression spring disposed concentrically around said telescoping sections and operatively connected to said lower section.

13. The safety gate assembly according to claim 12, wherein said compression spring is compressed to the greatest extend when the elongate segment is in the operative mode, and is substantially relaxed when the elongate segment is in the inoperative mode.

14. The safety gate assembly of claim 1 wherein the gate means includes upper and lower elongate segments provided with the interconnecting means whereby movement by one segment form an operative mode to an inoperative mode effects a corresponding movement of the other segment.

15. The safety gate assembly of claim 1, including a pair of laterally spaced, upright stanchions positionable on opposite sides of the passageway; and guard rails interconnecting s stanchion and support member positionable on each corresponding side of the passageway.

16. The safety gate assembly of claim 15 wherein the stanchion at each side of the passageway is disposed between the corresponding support member and a building wall having the passageway formed therein.

17. The safety gate assembly of claim 15 wherein the stanchions, support members and guard rails cooperate with one another to form an entry leading to the access passageway.

18. The safety gate assembly of claim 17 wherein the guard rails are horizontally disposed and prevent cross-traffic movement of loading dock vehicles within the entry.

19. The safety gate assembly according to claim 1, wherein a distal end of said at least one elongate member is disposed proximate one of said support members, such that an impact on said elongate member from a predetermined direction causes said elongate member to abut said support member.

* * * * *